United States Patent
Krishnamoorthy et al.

(10) Patent No.: US 9,603,180 B2
(45) Date of Patent: Mar. 21, 2017

(54) MANAGING TUNE-AWAY IN A MULTI-SUBSCRIBER IDENTITY MODULE COMMUNICATION DEVICE

(71) Applicant: QUALCOMM Incorporated, San Diego, CA (US)

(72) Inventors: Parthasarathy Krishnamoorthy, Hyderabad (IN); Anand Rajurkar, Hyderabad (IN); Reza Shahidi, San Diego, CA (US); Aziz Gholmieh, San Diego, CA (US); Navid Ehsan, San Diego, CA (US); Kuo-Chun Lee, San Diego, CA (US); Prashanth Mohan, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/624,810

(22) Filed: Feb. 18, 2015

(65) Prior Publication Data

US 2016/0242091 A1 Aug. 18, 2016

(51) Int. Cl.
*H04W 36/00* (2009.01)
*H04W 76/02* (2009.01)
*H04B 17/318* (2015.01)
*H04W 88/06* (2009.01)
*H04W 8/18* (2009.01)
*H04W 68/00* (2009.01)

(52) U.S. Cl.
CPC ........ *H04W 76/025* (2013.01); *H04B 17/318* (2015.01); *H04W 8/183* (2013.01); *H04W 68/005* (2013.01); *H04W 88/06* (2013.01)

(58) Field of Classification Search
CPC ..... H04W 36/00; H04W 36/36; H04W 36/30; H04W 68/005; H04W 76/025; H04W 8/183; H04W 88/06; H04W 36/0066; H04B 17/318
USPC ............ 455/437, 436, 438, 439, 440, 552.1, 455/553.1, 558
See application file for complete search history.

(56) References Cited

U.S. PATENT DOCUMENTS

| | | |
|---|---|---|
| 8,619,716 B2 | 12/2013 | Krishnamurthy et al. |
| 8,666,321 B2 | 3/2014 | Narasimha et al. |
| 8,761,788 B2 | 6/2014 | Rajurkar et al. |
| 8,811,421 B2 * | 8/2014 | Su ................ H04W 74/02 370/465 |
| 8,849,350 B1 | 9/2014 | Batchu et al. |
| 2013/0303168 A1 | 11/2013 | Aminzadeh Gohari et al. |

(Continued)

OTHER PUBLICATIONS

International Search Report and Written Opinion—PCT/US2016/013550—ISA/EPO—Apr. 6, 2016.

*Primary Examiner* — Temica M Beamer
*Assistant Examiner* — Sayed T Zewari
(74) *Attorney, Agent, or Firm* — The Marbury Law Group, PLLC

(57) ABSTRACT

Embodiments include systems and methods for managing tune-way in a multi-subscription communication device. A processor of a multi-subscription communication device may determine a first signal strength of a first cell signal and a second signal strength of a second cell signal. The processor may perform a tune-away procedure to a weaker of the first cell signal and the second cell signal. Embodiments may include determining signal strengths of each component carrier of the first cell signal and the second cell signal.

30 Claims, 7 Drawing Sheets

(56) References Cited

U.S. PATENT DOCUMENTS

2014/0146732 A1 5/2014 Olufunmilola et al.
2016/0021695 A1* 1/2016 Axmon ................ H04W 24/08
370/329

* cited by examiner

MANAGING TUNE-AWAY IN A MULTI-SUBSCRIBER IDENTITY MODULE COMMUNICATION DEVICE

BACKGROUND

Certain communication protocols, such as the 3GPP Long Term Evolution (LTE)-Advanced protocol, permit carrier aggregation (CA) in which a wireless device may schedule data traffic over multiple carrier bands (referred to as component carriers) to increase available bandwidth, and thus throughput, for voice and data communication. Carrier aggregation may be performed in the uplink (UCLA) and/or the downlink (DLCA), and may be performed using a varying number of component carriers (N number of component carriers, or N×CA).

Wireless devices having multiple subscriber identity modules (SIMs) may communicate with two or more cells of a wireless network. Some multi-subscription communication devices may allow two or more network interfaces or subscriber identity modules (SIMs) to share a single receiver/transmitter chain (e.g., dual SIM dual standby or "DSDS"). However, the receiver-transmitter chain in such devices can only tune to a single network at a time. The multi-subscription communication device may employ a "tune-away" procedure to monitor multiple interfaces in a standby mode by tuning to one network in a primary cell, quickly tuning away to the secondary network in a secondary cell for a short time, and then tuning back to the first network to continue a voice or data call. This tune-away procedure allows the multi-subscription communication device to monitor for pages or other indications of incoming messages or data received on the secondary network. However, tuning away to another network can interrupt communications with the first network and can reduce throughput of communications between the first network and the multi-subscription communication device.

Currently, the tune-away procedure is always performed in the secondary cell. This is inefficient because it does not account for varying radio frequency (RF) conditions in the primary and secondary cells. For example, when RF conditions in the secondary cell are superior to those in the primary cell, performing the tune-away procedure in the secondary cell will reduce throughput for an active communication session more than if the tune-away procedure were performed in the primary cell. This is due in part to the typical correlation between a higher signal strength (e.g., received signal strength indication (RSSI) or reference signal received power (RSRP)) and a higher modulation and coding scheme (MCS), which may provide a greater data rate or throughput for the multi-subscription communication device.

SUMMARY

Systems, methods, and devices of various embodiments enable a multi-subscription communication device to manage a tune-away by determining a first signal strength of a first cell signal and a second signal strength of a second cell signal, and performing, a tune-away procedure to a weaker of the first cell signal and the second cell signal. In some embodiment systems, determining a first signal strength of a first cell signal and a second signal strength of a second cell signal may include determining the first signal strength and the second signal strength just prior to the tune-away procedure. In some embodiment systems, determining a first signal strength of a first cell signal and a second signal strength of a second cell signal may include determining a signal strength of each component carrier of the first cell signal and a signal strength of each component carrier of the second cell signal.

Various embodiments may further include identifying from among the component carriers of the first and second cell signals a component carrier with a weakest signal strength, and performing the tune-away procedure to the cell signal having the component carrier with the weakest signal strength. Various embodiments may further include determining a carrier aggregation scheduling mechanism used in the first and second cell signals, identifying from among a secondary component carrier of each of the first and second cell signals a component carrier with a weakest signal strength in response to determining that the carrier aggregation scheduling mechanism is cross-carrier scheduling, and identifying from among a primary component carrier and a secondary component carrier of the first and second cell signals, respectively, a component carrier with a weakest signal strength in response to determining that the carrier aggregation scheduling mechanism is same-carrier scheduling.

In some embodiment systems, performing the tune-away procedure to the weaker of the first cell signal and the second cell signal may include tuning a receiver of the multi-subscription communication device to the component carrier with the weakest signal strength and not tuning a transmitter of the multi-subscription communication device associated with the receiver to the component carrier with the weakest signal strength in response to determining that the carrier aggregation scheduling mechanism is same-carrier scheduling. Various embodiments may further include determining a type of carrier aggregation used in the first and second cell signals, adjusting a signal strength difference threshold based on the determined type of carrier aggregation, comparing a difference between the first signal strength and the second signal strength to the signal strength difference threshold, and selecting one of the first cell signal and the second cell signal for the tune-away procedure when the difference between the first signal strength and the second signal strength exceeds the signal strength difference threshold.

Various embodiments include a multi-subscription communication device including a processor configured with processor-executable instructions to perform operations of the aspect methods described above. Various embodiments also include a non-transitory processor-readable storage medium having stored thereon processor-executable software instructions configured to cause a processor to perform operations of the aspect methods described above. Various embodiments also include a multi-subscription communication device that includes means for performing functions of the operations of the aspect methods described above.

BRIEF DESCRIPTION OF THE DRAWINGS

The accompanying drawings, which are incorporated herein and constitute part of this specification, illustrate exemplary embodiments. Together with the general description given above and the detailed description given below, the drawings serve to explain features of the various embodiments, and not to limit the various embodiments.

DETAILED DESCRIPTION

Figure 1:
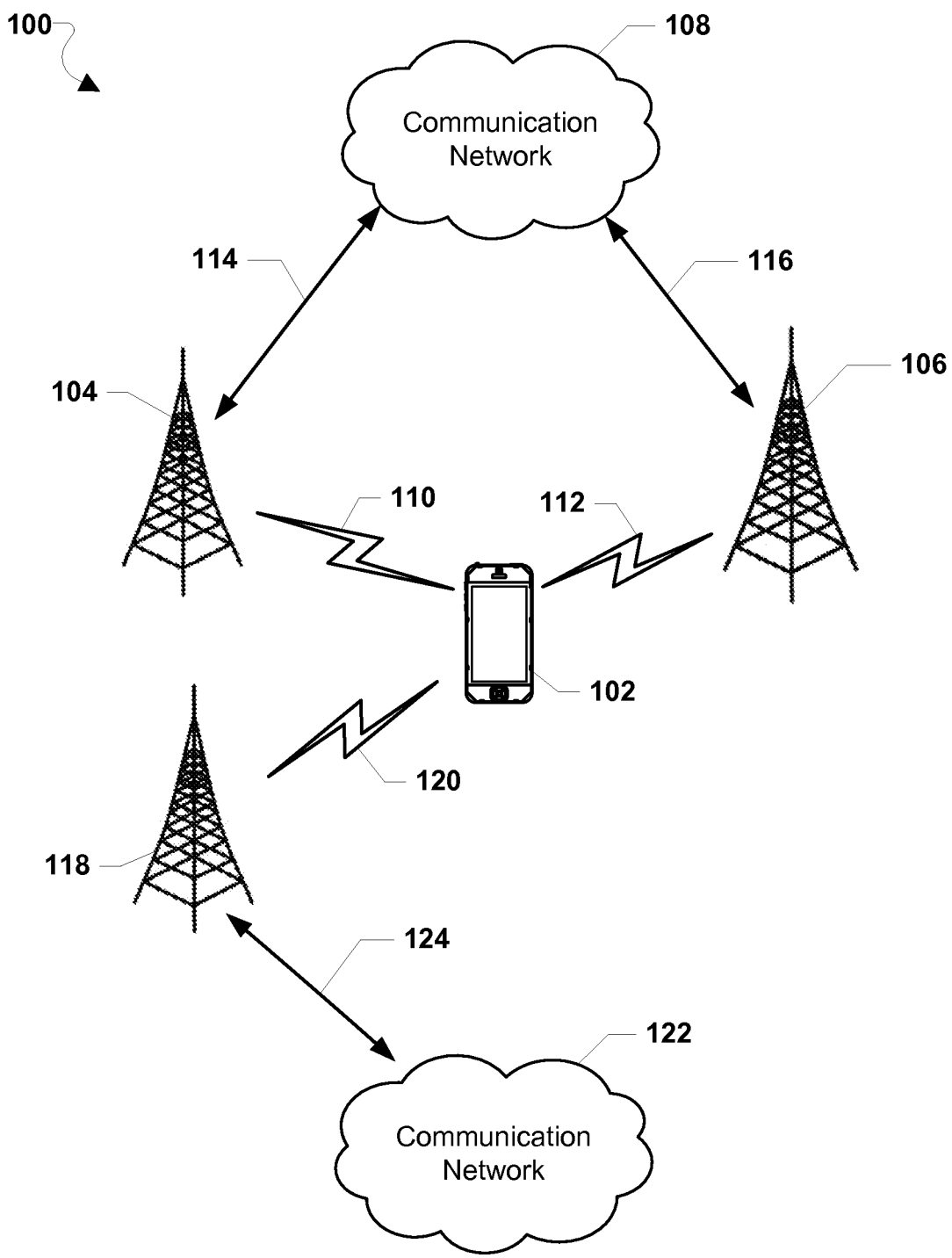
FIG. 1 is a component block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

The terms "multi-subscription communication device," "wireless device," and "mobile communication device" are used interchangeably herein to refer to any one or all of cellular telephones, smartphones, personal or mobile multi-media players, personal data assistants (PDAs), laptop computers, tablet computers, smartbooks, palmtop computers, wireless electronic mail receivers, multimedia Internet enabled cellular telephones, wireless gaming controllers, and similar electronic devices and portable computing platforms which include a programmable processor and a memory. Various embodiments may be particularly useful in any communication devices that use multiple radio access protocols to communicate with a communication network.

The terms "component," "module," "system," and the like as used herein are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Multi-subscription communication devices may communicate with two or more cells of a wireless network. Some multi-subscription communication devices may allow two or more network interfaces or SIMs to share a single receiver/transmitter chain. However, the receiver-transmitter chain in such devices can only tune to a single network at a time. The multi-subscription communication device may employ a tune-away procedure to monitor multiple interfaces in a standby mode by tuning to one network, quickly tuning away to the secondary network for a short time, and then tuning back to the first network to continue a voice or data call. This tune-away procedure allows the multi-subscription communication device to monitor for pages or other indications of incoming messages or data received on the secondary network. Different radio access technologies (RATs) may be used in the different networks. For example, in some implementations, the voice or data call may use 3GPP Long Term Evolution (LTE, or "L"), and the tune-away procedure may be performed using Global System for Mobility (GSM, or "G"). The timing of each tune-away period is typically specified by a radio access protocol (e.g., LTE or GSM). Tuning away to another network may interrupt transmissions to the first network, and may reduce throughput of data transmitted between the first network and the multi-subscription communication device.

Currently, the tune-away procedure is always performed (i.e., statically performed) in the secondary cell. Such performance is inefficient because tuning away to the secondary cell does not account for varying radio frequency (RF) conditions in the primary and secondary cells. For example, when RF conditions in the secondary cell are superior to those in the primary cell, performing a tune-away in the secondary cell will reduce throughput for the active communication session more than if the tune-away were performed in the primary cell. This is due in part to the fact that a higher signal strength is often correlated with a higher MCS, which may provide a greater data rate or throughput for the multi-subscription communication device during the tune-away period.

In various embodiments, a multi-subscription communication device may select one of a first cell and a second cell in which to perform the tune-away procedure based on the measured signal strengths of both cells so as to improve data throughput for the multi-subscription communication device during the tune-away period. The tune-away procedure is performed periodically at times typically dictated by the RAT. Just prior to each tune-away period, the multi-subscription communication device may determine a signal strength of a cell signal in each of the two cells. Based on the determined signal strengths of the first cell signal and the second cell signal, the multi-subscription communication device may select the cell with the weaker signal strength, and perform the tune-away procedure with the selected cell. During the tune-away procedure, the multi-subscription communication device may tune-away a wireless transceiver of the multi-subscription communication device that corresponds to the selected cell. In various embodiments, while the first and second cell signals may use a first RAT, the multi-subscription communication device may use a second RAT for the tune-away procedure.

The various embodiments are particularly beneficial when the multi-subscription communication device is configured to use carrier aggregation among the first and second cell signals in order to improve data transfer rates. Some RATs, such as LTE-Advanced, enable the use of carrier aggregation (also referred to as channel aggregation) in which more than one carrier (each a "component carrier") may be used to send and receive communications in an aggregated channel in order to increase overall communication bandwidth. Carrier aggregation may be performed intra-band (using contiguous or non-contiguous component carriers) or inter-band. The number of component carriers used for carrier aggregation may vary according to the RAT. For example, LTE-Advanced may enable up to five 20 MHz carriers to be aggregated. One component carrier may be designated the primary component carrier, and may have an associated uplink primary component carrier. The remaining component carriers may be designated secondary component carriers. The primary component carrier is the main downlink carrier. The designation of primary and second component carriers is typically cell specific.

In various embodiments, when carrier aggregation is used in each cell, the multi-subscription communication device may determine the signal strength of each component carrier in each cell signal. The multi-subscription communication device may select the cell with the weakest component carrier of each cell signal in which to perform the tune-away procedure, and the multi-subscription communication device may tune-away the wireless transceiver corresponding to the weakest component carrier. This enables the stronger component carrier to continue to be used for receiving data during the tune-away procedure.

In various embodiments, the multi-subscription communication device may also determine a scheduling mechanism used for carrier aggregation. Carrier aggregation may employ same- (or direct-) carrier scheduling and cross-carrier scheduling. In same-carrier scheduling, resources may be scheduled on the same carrier on which a scheduling grant is received, and each component carrier includes a separate physical downlink control channel (PDCCH). In cross-carrier scheduling, resources may be scheduled on a different carrier (typically a secondary component carrier) without a PDCCH. Instead, a different carrier includes the PDCCH, and a carrier indication field on the PDCCH may indicate the carrier on which the resource is scheduled. When cross-carrier scheduling is active, a physical downlink shared channel (PDSCH) or a physical uplink shared channel (PUSCH) may be transmitted on an associated component carrier other than the PUCCH, and a carrier indicator in the PDCCH may provide information about the component carrier used for the PDSCH or PUSCH.

In various embodiments, when same-carrier (direct-carrier) scheduling is used, the multi-subscription communication device may evaluate the signal strength of both primary and secondary component carriers, which may be done over a period of time. In some embodiments, when the primary component carrier is determined to have the weakest signal strength, the multi-subscription communication device may use receiver-only tune-away (ROTA) to tune away only the receiver associated with the primary component carrier, which may reduce the impact of the tune-away on throughput or data reception by the multi-subscription communication device. The multi-subscription communication device may select the cell including the component carrier with the weakest signal strength in which to perform the tune-away procedure, and the multi-subscription communication device may tune-away a transceiver corresponding to the weakest component carrier.

In various embodiments, when cross-carrier scheduling is used, the multi-subscription communication device may evaluate only the signal strength of the secondary component carriers, which may be done over a period of time. The multi-subscription communication device may select the cell including the component carrier with the weakest signal strength in which to perform the tune-away procedure, and the multi-subscription communication device may tune-away a wireless transceiver corresponding to the weakest component carrier.

In various embodiments, the multi-subscription communication device also may determine whether the carrier band aggregation employs intra-band or inter-band carrier aggregation. The multi-subscription communication device may dynamically set a threshold for determining a weaker or stronger component carrier based on the determination. In inter-band carrier aggregation (i.e., using component carriers from different carrier/frequency bands) the differences in signal strength and other signal characteristics are usually more pronounced than with intra-band carrier aggregation (i.e., using component carriers from the same carrier/frequency band). For intra-band carrier aggregation, the multi-subscription communication device may adjust the threshold lower to account for the decreased differences between component carriers.

Various embodiments may be implemented in multi-subscription communication devices that may operate within a variety of communication systems particularly systems that include at least two communication networks. FIG. 1 illustrates a communication system 100 suitable for use with various embodiments. A multi-subscription communication device 102 may communicate with a communication network 108, which may include a plurality of base stations, such as base stations 104, 106. The multi-subscription communication device 102 may also communicate with a communication network 122, which may include a base station 118. The base station 104 may communicate with the communication network 108 over a wired or wireless communication link 114, which may include fiber optic backhaul links, microwave backhaul links and other similar communication links. The base station 106 may communicate with the communication network 108 over a wired or wireless communication link 116 similar to the communication link 114. The base station 118 may communicate with the communication network 122 over a wired or wireless communication link 124 similar to the communication link 114. In some embodiments, each communication network 108, 122 may include a mobile telephony communication network. The multi-subscription communication device 102 may communicate with the base station 104 over a wireless communication link 110, with the base station 106 over a wireless communication link 112, and with the base station 118 over a wireless communication link 120.

Each of the communication networks 108, 122 may support communications using one or more RATs, and each of the wireless communication links 110, 112, and 120 may include cellular connections that may be made through two-way wireless communication links using one or more RATs. Examples of RATs may include LTE, Worldwide Interoperability for Microwave Access (WiMAX), Code Division Multiple Access (CDMA), Time Division Multiple Access (TDMA), Wideband CDMA (WCDMA), GSM, and other RATs. While the communication links 110, 112, 120 are illustrated as single links, each of the communication links 110, 112, 120 may include a plurality of frequencies or frequency bands, each of which may include a plurality of logical channels. Additionally, each of the communication links 110, 112, 120 may utilize more than one RAT. For example, the multi-subscription communication device 102 may receive a first cell signal from the base station 104 and a second cell signal from the base station 106, and the multi-subscription communication device 102 may determine a signal strength each of the cell signals. The multi-subscription communication device 102 may use a receiver or transceiver associated with the weaker of the first cell signal and the second cell signal to perform the tune-away procedure. In some embodiments, the first and second cell signals may use a first RAT. In some embodiments, the multi-subscription communication device 102 may also perform a tune-away procedure using a second RAT.

Figure 2:
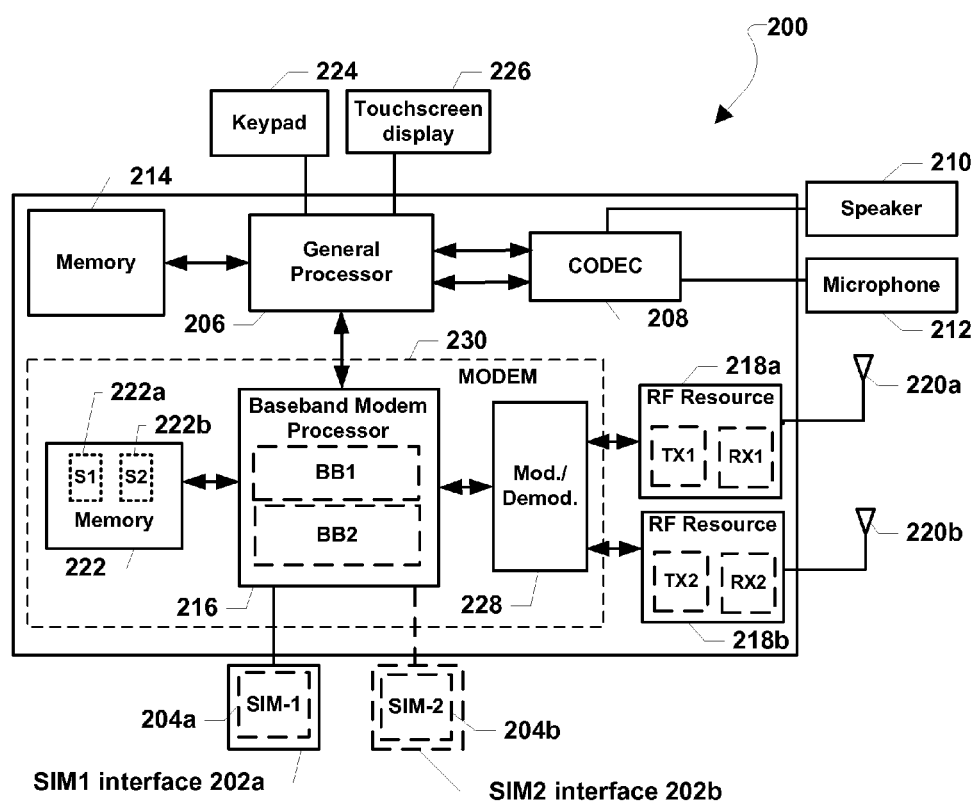
FIG. 2 is a component block diagram of a multi-subscription communication device according to various embodiments.

FIG. 2 is a component block diagram of a multi-subscription communication device 200 suitable for implementing various embodiments. In various embodiments, the multi-subscription communication device 200 may be similar to the multi-subscription communication device 102 as described with reference to FIG. 1. With reference to FIGS. 1 and 2, the multi-subscription communication device 200 may include a first SIM interface 202a, which may receive a first identity module SIM-1 204a that is associated with a first subscription. The multi-subscription communication device 200 may optionally also include a second SIM interface 202b, which may receive a second identity module SIM-2 204b that is associated with a second subscription.

A SIM in various embodiments may be a Universal Integrated Circuit Card (UICC) that is configured with SIM and/or USIM (Universal Subscriber Identity Module) applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various embodiments may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The multi-subscription communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory computer-readable storage medium that stores processor-executable instructions. The memory 214 may store an operating system (OS), as well as user application software and executable instructions. The memory 214 may also store application data, such as an array data structure.

The general purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to one or more RF resources 218a, 218b for transmission. The modulator/demodulator 228 may also extract an information-bearing signal from a modulated carrier wave received from the one or more RF resources 218a, 218b, and may provide the demodulated signal to the baseband modem processor 216. The modulator/demodulator 228 may be or include a digital signal processor (DSP).

The baseband modem processor 216 may read and write information to and from the memory 222. The memory 222 may also store instructions associated with a protocol stack, such as protocol stack S1 222a and protocol stack S2 222b. The protocol stacks S1 222a, S2 222b generally include computer executable instructions to enable communication using a radio access protocol or communication protocol. Each protocol stack S1 222a, S2 222b typically includes network protocol layers structured hierarchically to provide networking capabilities. The modem 230 may include one or more of the protocol stacks S1 222a, S2 222b to enable communication using one or more RATs. The protocol stacks S1 222a, S2 222b may be associated with a SIM card (e.g., SIM-1 204a, SIM-2 204b) configured with a subscription. For example, the protocol stack S1 222a and the protocol stack S2 222b may be associated with the SIM-1 204a. The illustration of only two protocol stacks S1 222a, S2 222b is not intended as a limitation, and the memory 222 may store more than two protocol stacks (not illustrated).

Each SIM and/or RAT in the multi-subscription communication device 200 (e.g., SIM-1 204a, SIM-2 204b) may be coupled to the modem 230 and may be associated with or permitted to use a baseband-RF resource chain. Each baseband-RF resource chain may include the baseband modem processor 216 to perform baseband/modem functions for communicating with/controlling a RAT, and one or more amplifiers and radios, referred to generally herein as RF resources. In some embodiments, baseband-RF resource chains may share a common baseband modem processor 216 (i.e., a single device that performs baseband/modem functions for all RATs on the multi-subscription communication device). Alternatively, each baseband-RF resource chain may include the physically or logically separate baseband processors (e.g., BB1, BB2).

The RF resources 218a, 218b may be transceivers associated with one or more RATs and may perform transmit/receive functions for the mobile communication device 200 on behalf of their respective RATs. The RF resources 218a, 218b may include separate transmit and receive circuitry. In some embodiments, the RF resource 218b may include only receive circuitry. The RF resources 218a, 218b may each be coupled to a wireless antenna (e.g., a first wireless antenna 220a and a second wireless antenna 220b). The RF resources 218a, 218b may also be coupled to the baseband modem processor 216.

In some embodiments, the general purpose processor 206, memory 214, baseband processor(s) 216, and the RF resources 218a, 218b may be included in the mobile communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile communication device 200 may include, but are not limited to, a keypad 224 and a touchscreen display 226.

In some embodiments, the keypad 224, the touchscreen display 226, the microphone 212, or a combination thereof may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the multi-subscription communication device 200 to enable communication between them.

Functioning together, the two SIMs 204a, 204b, the baseband processor(s) 216, RF resources 218a, 218b and the antennas 220*a*, 220*b* may enable communications on two or more RATs. For example, one SIM, baseband processor, and RF resource may be configured to support two different RATs. In other embodiments, more RATs may be supported on the multi-subscription communication device 200 by adding more SIM cards, SIM interfaces, RF resources, and antennas for connecting to additional mobile networks.

Figure 3:
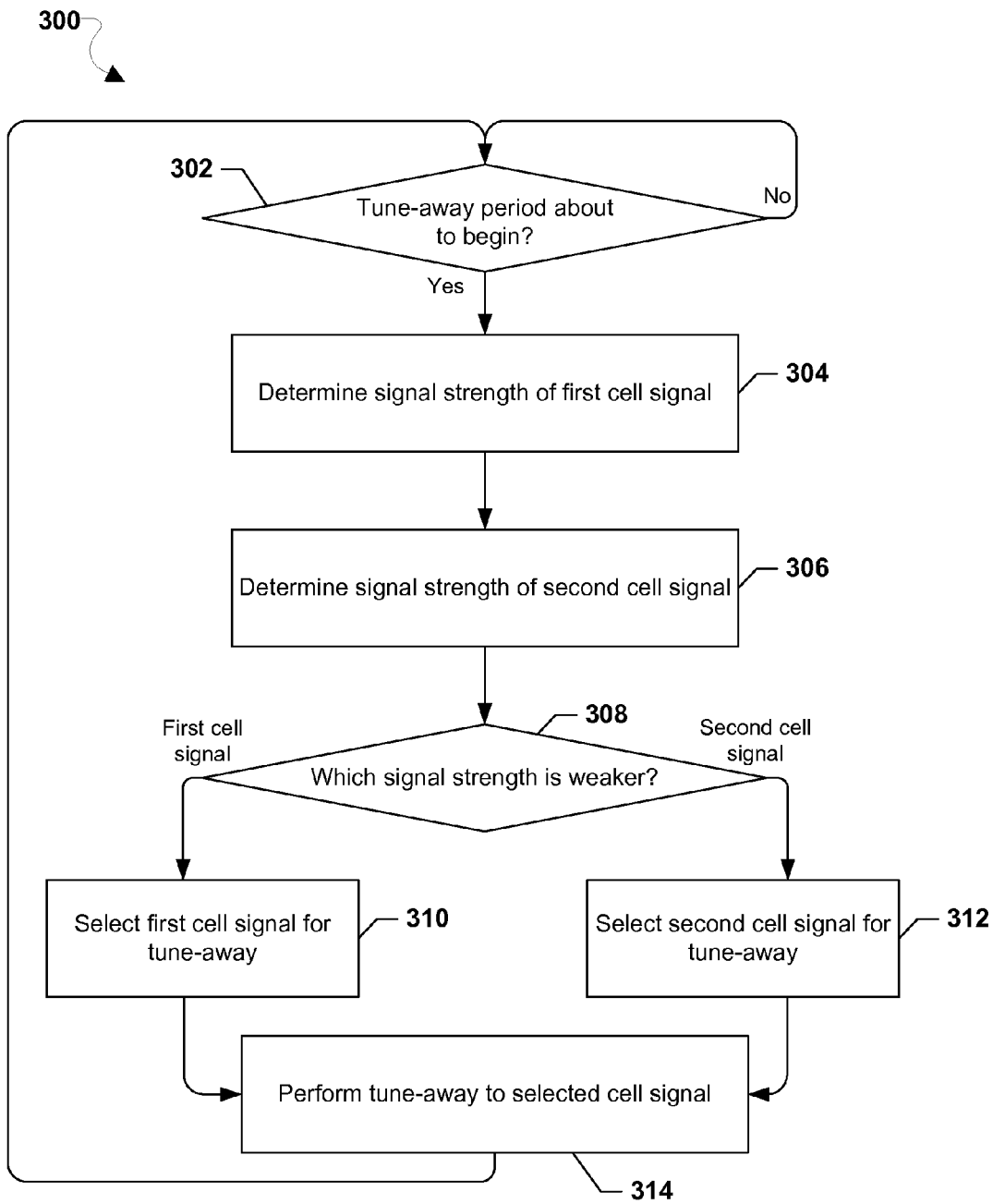
FIG. 3 is a process flow diagram illustrating a method for managing tune-away in a multi-subscription communication device according to various embodiments.

FIG. 3 illustrates a method 300 for managing tune-away in a multi-subscription wireless device (e.g., the multi-subscription communication device 102, 200 in FIGS. 1-2) according to some embodiments. The method 300 may be implemented by a processor (e.g., the general purpose processor 206 of FIG. 2, the baseband processor 216, a separate controller, and/or the like) of the multi-subscription communication device.

With reference to FIGS. 1-3, in determination block 302, the multi-subscription communication device processor may determine whether a tune-away period is about to begin. In response to determining that a tune-away period is not about to begin (i.e., determination block 302="No"), the multi-subscription communication device processor may continue to determine whether a tune-away period is about to begin in determination block 302.

In response to determining that a tune-away period is about to begin (i.e., determination block 302="Yes"), the multi-subscription communication device processor may determine a signal strength of a first cell signal in block 304, and determine a signal strength of a second cell signal in block 306. When more than two cell signals are being used simultaneously (e.g., in LTE-Advanced), the signal strength of each of the cells may be determined at the same time (e.g., simultaneously or in sequence).

The signal strengths measured for the first and second cells may include a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and other similar signal strength metrics. The signal strengths may be determined based on a pilot signal, a received data channel, a received control channel, or another signal, including combinations of the foregoing. By determining the signal levels of the first and second cell signals just prior to a tune-away procedure, the processor of the multi-subscription communication device may dynamically account for variations in signal strength, RF conditions, and other communication link characteristics over time, owing to the RF environment, mobility of the multi-subscription communication device relative to the first and second cells, and other environmental conditions.

In determination block 308, the multi-subscription communication device processor may identify the signal with the weaker signal strength. While determination block 308 is shown as being as between the first cell signal and the second cell signal, determination block 308 may determine the weaker signal among all concurrent channels (e.g., up to five channels in LTE-Advanced), and therefore the references to the first and second cell signals is not intended to be limiting.

In response to determining that the first cell signal strength is weaker (i.e., determination block 308="first cell signal"), the multi-subscription communication device processor may select the first cell signal to use for performing the upcoming tune-away procedure in block 310. In response to determining that the second cell signal strength is weaker (i.e., determination block 308="second cell signal"), the multi-subscription communication device processor may select the second cell signal to use for performing the upcoming tune-away procedure in block 312. In block 314, the multi-subscription communication device processor may perform the tune-away procedure using the selected cell signal (i.e., using the identified weakest cell signal).

The multi-subscription communication device processor may again determine whether a tune-away period is about to begin in determination block 302 to repeat the method 300 during the next tune-away period. In this manner, the multi-subscription communication device may dynamically determine signal strengths of the first and second cell signals, and perform each tune-away procedure using the weaker of the two or more cells signals. In various embodiments, using the weakest cell signal to perform the tune-away procedure may increase multi-subscription communication device performance by increasing the available bandwidth for communications.

Figure 4:
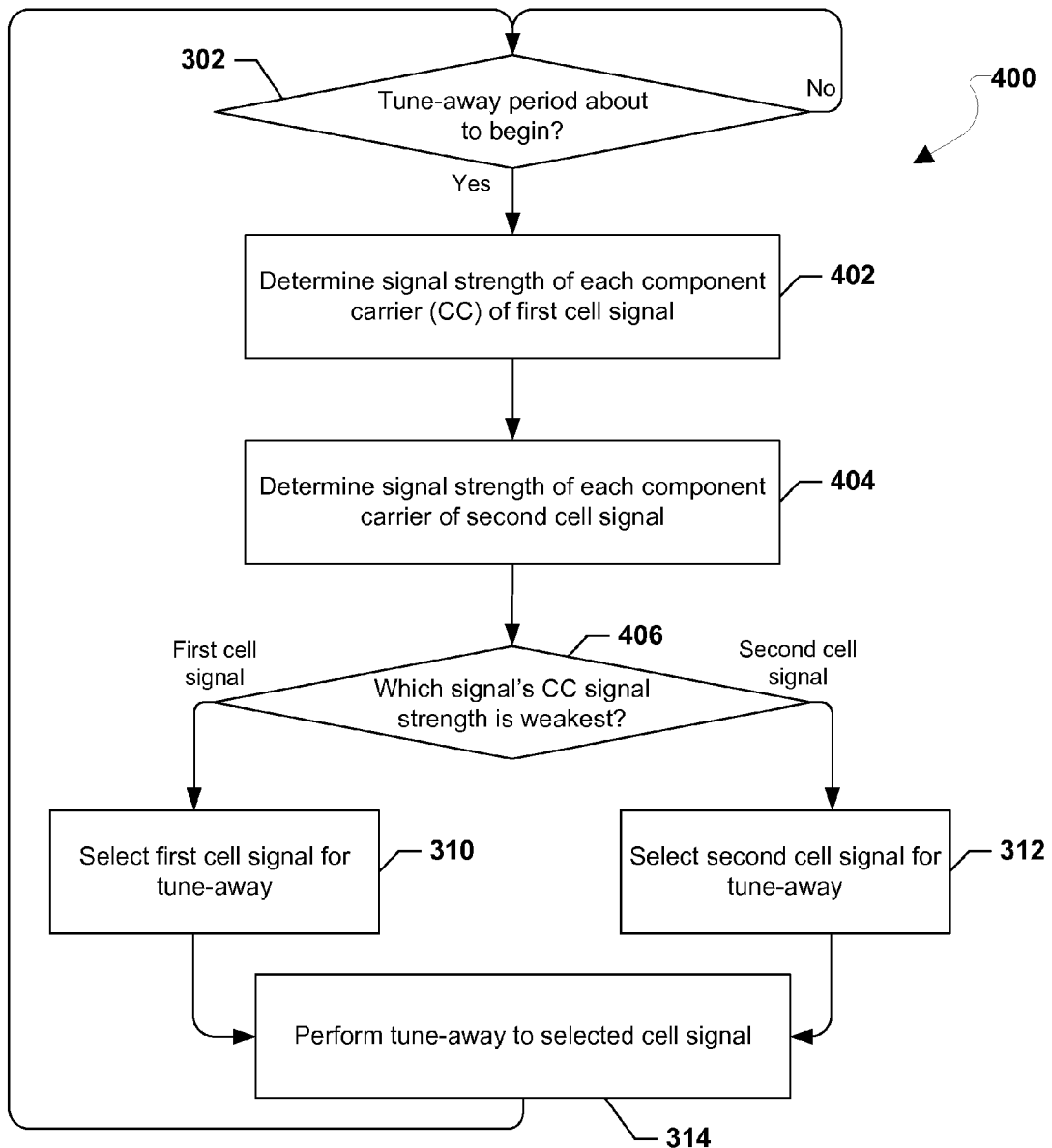
FIG. 4 is a process flow diagram illustrating another method for managing tune-away in a multi-subscription communication device according to various embodiments.

FIG. 4 illustrates a method 400 for managing tune-away in a multi-subscription communication device (e.g., the multi-subscription communication device 102, 200 in FIGS. 1-2) according to some embodiments. The method 400 may be implemented by a processor (e.g., the general purpose processor 206 of FIG. 2, the baseband processor 216, a separate controller, and/or the like) of the multi-subscription communication device.

With reference to FIGS. 1-4, in determination block 302, as in the method 300 (FIG. 3), the multi-subscription communication device processor may determine whether a tune-away period is about to begin. In response to determining that a tune-away period is not about to begin (i.e., determination block 302="No"), the multi-subscription communication device processor may continue to determine whether a tune-away period is about to begin in determination block 302.

In response to determining that a tune-away period is about to begin (i.e., determination block 302="Yes"), the multi-subscription communication device processor may determine a signal strength of each component carrier in a first cell signal in block 402, and determine a signal strength of each component carrier in a second cell signal in block 404. When more than two cell signals are being used simultaneously (e.g., in LTE-Advanced), the signal strength of each of the cells may be determined at the same time (which may include simultaneously or in sequence).

As described, the signal strengths measured for the first and second cells may include a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and other similar signal strength metrics. The signal strengths may be determined based on a pilot signal, a received data channel, a received control channel, or another signal, including combinations of the foregoing. By determining the signal levels of the first and second cell signals just prior to a tune-away procedure, the multi-subscription communication device processor may dynamically account for variations in signal strength, RF conditions, and other communication link characteristics over time, owing to the RF environment, mobility of the multi-subscription communication device relative to the first and second cells, and other environmental conditions.

In determination block 406, the multi-subscription communication device processor may identify the cell signal with the weakest component carrier ("CC"). In response to determining that the first cell signal includes the weakest component carrier (i.e., determination block 406="first cell signal"), the processor may select the first cell signal to use for performing the upcoming tune-away procedure in block 310, as in the method 300. In response to determining that the second cell signal is weaker (i.e., determination block 406="second cell signal"), the processor may select the second cell signal to use for performing the upcoming tune-away procedure in block 312, as in the method 300. Similar to the method 300, in block 314, the processor may perform the tune-away procedure using the selected cell signal.

The multi-subscription communication device processor may again determine whether a tune-away period is about to begin in determination block 302 to repeat the method 400 for the next tune-away period. In this manner, the multi-subscription communication device may dynamically determine the signal strengths of the component carriers of the first and second cell signals, and perform each tune-away procedure using the cell with the weakest component carriers.

Figure 5:
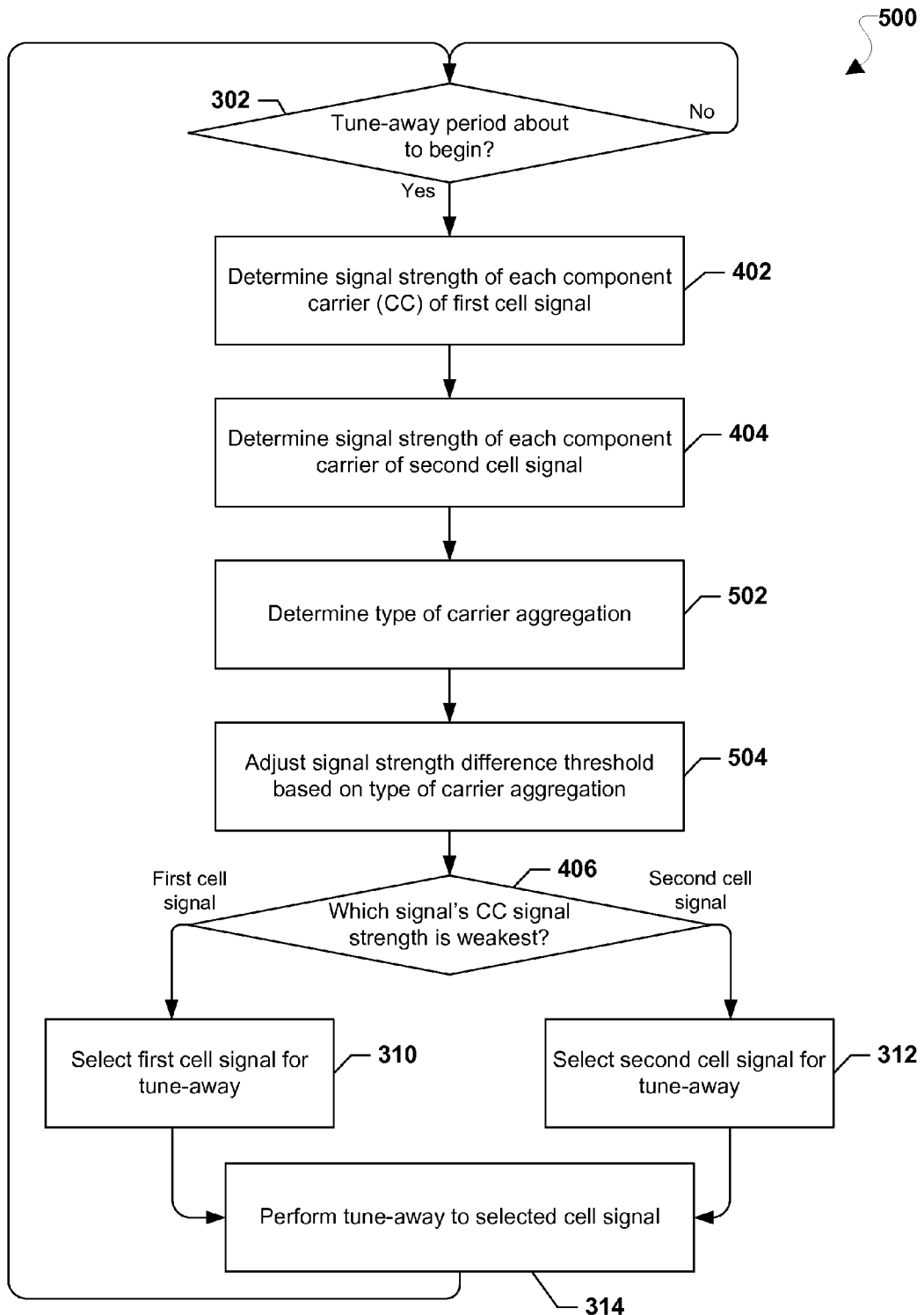
FIG. 5 is a process flow diagram illustrating another method for managing tune-away in a multi-subscription communication device according to various embodiments.

FIG. 5 illustrates a method 500 for managing tune-away in a multi-subscription communication device (e.g., the multi-subscription communication device 102, 200 in FIGS. 1-2) according to some embodiments. The method 500 may be implemented by a processor (e.g., the general purpose processor 206 of FIG. 2, the baseband processor 216, a separate controller, and/or the like) of the multi-subscription communication device.

With reference to FIGS. 1-5, in determination block 302, as in the methods 300 and 400, the multi-subscription communication device processor may determine whether a tune-away period is about to begin. In response to determining that a tune-away period is not about to begin (i.e., determination block 302="No"), the multi-subscription communication device processor may continue to determine whether a tune-away period is about to begin in determination block 302.

In response to determining that a tune-away period is about to begin (i.e., determination block 302="Yes"), the multi-subscription communication device processor may determine a signal strength of each component carrier in a first cell signal in block 402, and determine a signal strength of each component carrier in a second cell signal in block 404, as in the method 400. When more than two cell signals are being used simultaneously (e.g., in LTE-Advanced), the signal strength of each of the cells may be determined at the same time.

As described, the signal strengths measured for the first and second cells may include a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), and other similar signal strength metrics. The signal strengths may be determined based on a pilot signal, a received data channel, a received control channel, or another signal, including combinations of the foregoing. By determining the signal levels of the first and second cell signals just prior to a tune-away procedure, the multi-subscription communication device processor may dynamically account for variations in signal strength, RF conditions, and other communication link characteristics over time, owing to the RF environment, mobility of the multi-subscription communication device relative to the first and second cells, and other environmental conditions.

In block 502, the multi-subscription communication device processor may determine a type of carrier aggregation used in the first and second cell signals. For example, the multi-subscription communication device processor may determine whether intra-band or inter-band carrier aggregation is employed. In block 504, the multi-subscription communication device processor may adjust a difference threshold for use in comparing the signal strengths of each component carrier of the first and second cell signals based on the type of carrier aggregation used in the first and second cell signals (e.g., from block 502). For example, the multi-subscription communication device processor may dynamically set a signal strength difference threshold for determining a weaker or stronger component carrier based on whether intra-band or inter-band carrier aggregation is employed. In inter-band carrier aggregation (i.e., using component carriers from different carrier/frequency bands) the differences in signal strength and other signal characteristics may be more pronounced than with intra-band carrier aggregation (i.e., using component carriers from the same carrier/frequency band). For intra-band carrier aggregation, the multi-subscription communication device may adjust the threshold lower, or may select a relatively lower threshold, to account for the decreased differences between component carriers. For inter-band carrier aggregation, the multi-subscription communication device may adjust the threshold higher, or may select a relatively higher threshold.

In determination block 406, as in the method 400 the multi-subscription communication device processor may identify the cell signal with the weakest component carrier. In some embodiments, determining the cell signal with the weakest component carrier may include determining the component carrier signal strength that is lower than its next-highest neighbor component carrier signal strength by at least the difference threshold. In some embodiments, the multi-subscription communication device processor may identify the cell signal with the weakest component carrier and select one of the first cell signal and the second cell signal for the tune-away procedure when the difference between the first signal strength and the second signal strength exceeds the signal strength difference threshold.

When the first cell signal includes the weakest component carrier (i.e., determination block 406="first cell signal"), the multi-subscription communication device processor may select the first cell signal to use for performing the upcoming tune-away procedure in block 310, as in the methods 300 and 400. When the second cell signal is weaker (i.e., determination block 406="second cell signal"), the multi-subscription communication device processor may select the second cell signal to use for performing the upcoming tune-away procedure in block 312, as in the methods 300 and 400. Similar to the methods 300 and 400, in block 314, the multi-subscription communication device processor may perform the tune-away procedure using the selected cell signal.

The multi-subscription communication device processor may again determine whether a tune-away period is about to begin in determination block 302 to repeat the method 500 for the next tune-away period. In this manner, the multi-subscription communication device may dynamically determine the signal strengths of the component carriers of the first and second cell signals, and perform each tune-away procedure using the cell with the weakest component carriers.

Figure 6:
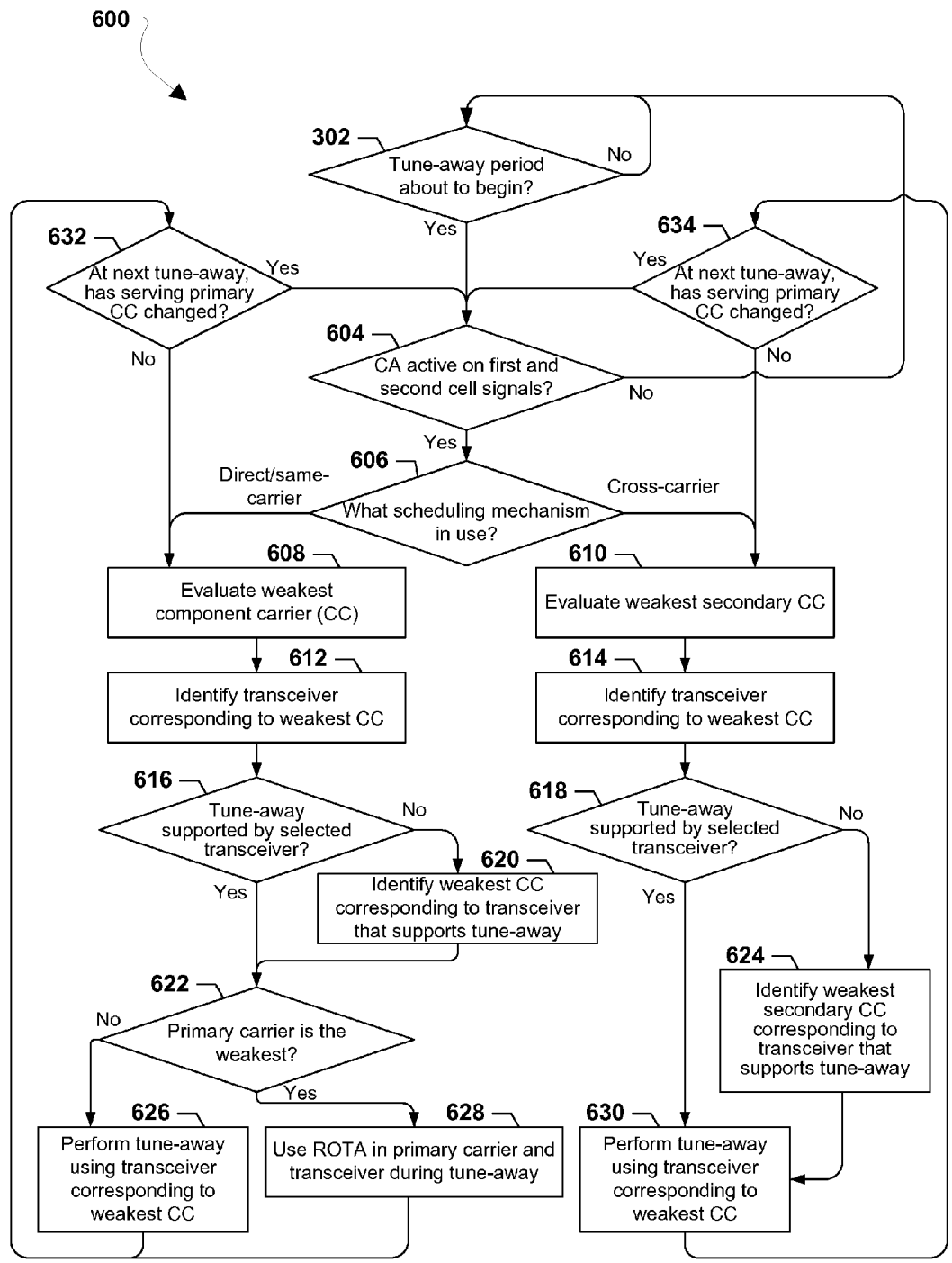
FIG. 6 is a process flow diagram illustrating another method for managing tune-away in a multi-subscription communication device according to various embodiments.

FIG. 6 illustrates a method 600 for managing tune-away in a multi-subscription communication device (e.g., the multi-subscription communication device 102, 200 in FIGS.

1-2) according to some embodiments. The method 600 may be implemented by a processor (e.g., the general purpose processor 206 of FIG. 2, the baseband processor 216, a separate controller, and/or the like) of the multi-subscription communication device.

With reference to FIGS. 1-6, in determination block 302, the multi-subscription communication device processor may determine whether a tune-away period is about to begin, as in the methods 300, 400, and 500. In response to determining that a tune-away period is not about to begin (i.e., determination block 302="No"), the multi-subscription communication device processor may continue to determine whether a tune-away period is about to begin in determination block 302.

In response to determining that a tune-away period is about to begin (i.e., determination block 302="Yes"), in determination block 604, the multi-subscription communication device processor may determine whether carrier aggregation is in use in detectable signals of each cell (e.g., at least first and second cell signals). In response to determining that carrier aggregation is not in use in the (at least) first and second cell signals (i.e., determination block 604="No"), the multi-subscription communication device processor may return to determining whether a tune-away period is about to begin in determination block 302.

In response to determining that carrier aggregation is in use in the first and second cell signals (i.e., determination block 604="Yes"), the multi-subscription communication device processor may determine the scheduling mechanism that is in use in block 606. Carrier aggregation may employ same-carrier (or direct-carrier) scheduling and cross-carrier scheduling. In same-carrier scheduling, resources may be scheduled on the same carrier on which a scheduling grant is received, an each component carrier includes a separate PUCCH. In cross-carrier scheduling, resources may be scheduled on a different carrier (typically a secondary component carrier) without a PDCCH. In cross-carrier scheduling, a different carrier includes the PDCCH, and a carrier indication field on the PDCCH may indicate the carrier on which the resource is scheduled. When cross-carrier scheduling is active, a PDSCH or a PUSCH may be transmitted on an associate component carrier other than the PUCCH, and a carrier indicator in the PDCCH may provide information about the component carrier used for the PDSCH or PUSCH.

In response to determining that same-carrier (direct-carrier) scheduling is in use (i.e., determination block 606="Direct/same-carrier"), the multi-subscription communication device processor may evaluate the weakest component carrier based on the signal strength of both primary and secondary component carriers in block 608 (which may be done over a period of time). In block 612, the multi-subscription communication device processor may identify the transceiver of the multi-subscription communication device that corresponds to the weakest component carrier. In determination block 616, the multi-subscription communication device processor may determine whether the tune-away procedure is supported by the selected transceiver (i.e., whether the selected transceiver may be configured to perform the tune-away procedure).

In response to determining that the selected transceiver does not support the tune-away procedure (i.e., determination block 616="No"), the multi-subscription communication device processor may re-evaluate the signal strength of the component carriers of the first and second cell signals in block 620 in order to identify the weakest component carrier from among the component carriers associated with a transceiver that may be configured to perform the tune-away procedure. The multi-subscription communication device processor may determine whether the weakest component carrier is the primary carrier in determination block 622. In response to determining that the selected transceiver can support (i.e., may be configured to perform) the tune-away procedure (i.e., determination block 616="Yes"), the multi-subscription communication device processor may determine whether the weakest component carrier is the primary carrier in determination block 622.

In response to determining that the weakest component carrier is the primary component carrier (i.e., determination block 622="Yes"), the multi-subscription communication device processor may use receiver-only tune-away ("ROTA") to tune-away only the receiver associated with the primary component carrier in block 628. Such a tune-away of only the receiver may reduce the impact of the tune-away on throughput or data reception by the multi-subscription communication device. In response to determining that the weakest component carrier is not the primary component carrier (i.e., determination block 622="No"), the multi-subscription communication device processor may perform the tune-away procedure using the transceiver that corresponds to the weakest component carrier in block 626.

In determination block 632 (which may occur after block 626 or block 628), the multi-subscription communication device processor may determine just before the next tune-away period begins whether the assignment of the primary component carrier has been changed. In response to determining that the serving primary component carrier has changed (i.e., determination block 632="Yes"), the multi-subscription communication device processor may determine whether carrier aggregation ("CA") is in use in the first and second cell signals in determination block 604 as described. In response to determining that the serving primary component carrier has not changed (i.e., determination block 632="No"), the multi-subscription communication device processor device may evaluate the signal strength of both primary and secondary component carriers in block 608 as described.

Returning to determination block 606, in response to determining that cross-carrier scheduling is in use (i.e., determination block 606="cross-carrier"), the multi-subscription communication device processor may evaluate the signal strength of only the secondary component carriers in block 610 (which may be done over a period of time), and the multi-subscription communication device processor may not evaluate the primary component carrier. In block 614, the multi-subscription communication device processor may identify the transceiver of the multi-subscription communication device that corresponds to the weakest component carrier. In determination block 618, the multi-subscription communication device processor may determine whether the tune-away procedure is supported by the selected transceiver (i.e., whether the selected transceiver may be configured to perform the tune-away procedure). In response to determining that the selected transceiver does not support the tune-away procedure (i.e., determination block 618="No"), the multi-subscription communication device processor may evaluate the signal strength of the component carriers of the first and second cell signals corresponding to transceivers of the multi-subscription communication device that support (i.e., may be configured to perform) the tune-away procedure in block 624 in order to identify the weakest component carrier from among the secondary component carriers associated a with transceiver that may be configured to perform the tune-away procedure. In block 630, the multi-subscription communication device processor may perform the tune-away procedure using the transceiver corresponding to the weakest component carrier.

In response to determining that the selected transceiver can support the tune-away procedure (i.e., determination block 618="Yes"), the multi-subscription communication device processor may perform the tune-away procedure using the transceiver corresponding to the weakest component carrier in block 630.

In determination block 634, the multi-subscription communication device processor may determine just before the next tune-away period begins whether the assignment of the primary component carrier has been changed. In response to determining that the serving primary component carrier has changed (i.e., determination block 634="Yes"), the multi-subscription communication device processor may determine whether carrier aggregation is in use in the first and second cell signals in determination block 604 as described. In response to determining that the serving primary component carrier has not changed (i.e., determination block 634="No"), the multi-subscription communication device processor may evaluate the signal strength of the secondary component carriers in block 610 as described.

Figure 7:
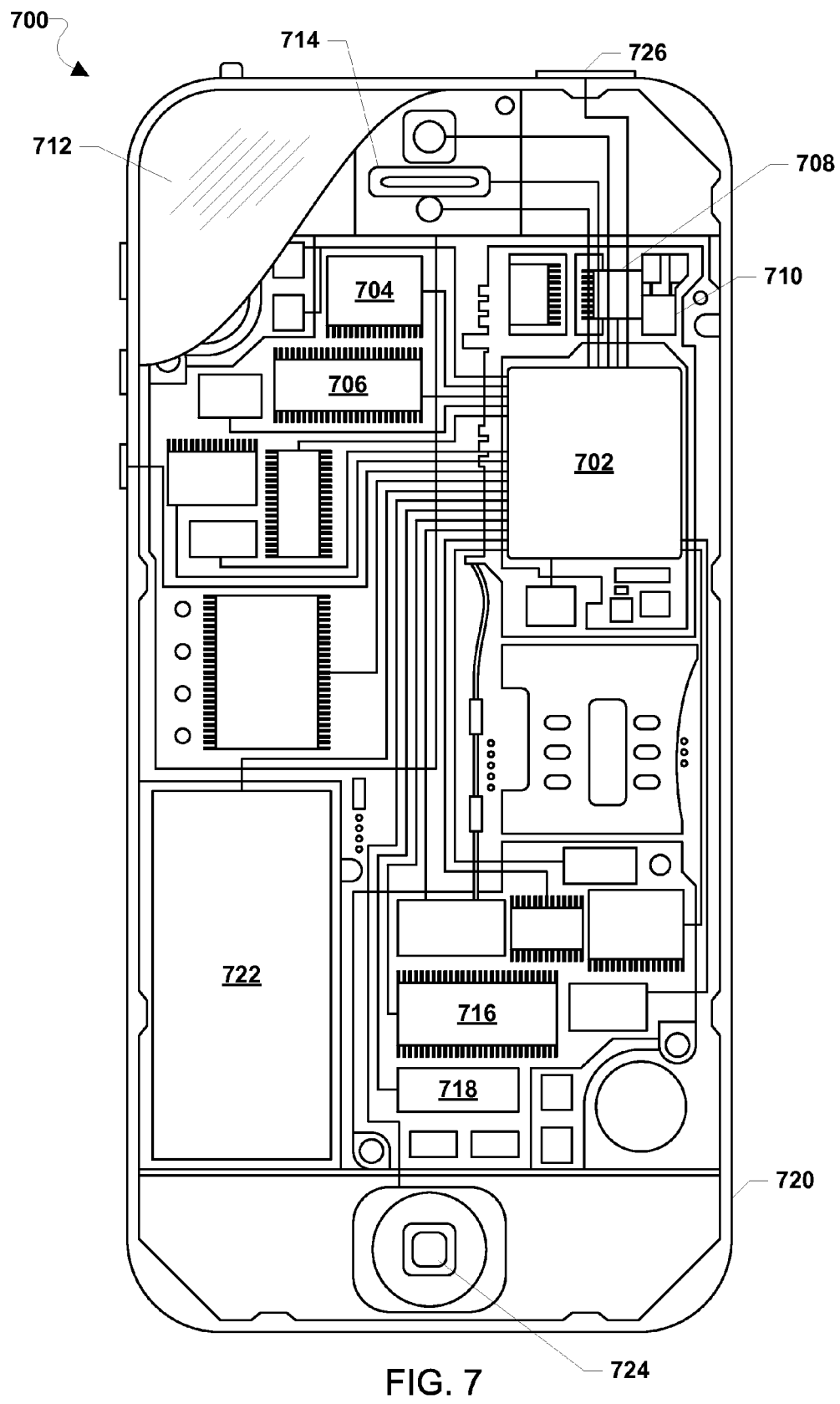
FIG. 7 is a component block diagram of a mobile communication device suitable for use with various embodiments

Various embodiments (including, but not limited to, embodiments discussed above with reference to FIGS. 3-6) may be implemented in any of a variety of mobile communication devices, an example of which (e.g., mobile communication device 700) is illustrated in FIG. 7. In various embodiments, the mobile communication device 700 (which may correspond, for example, to the multi-subscription communication devices 102 and 200 in FIGS. 1-2) may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile communication device 700 need not have touch screen capability.

The mobile communication device 700 may have two or more radio signal transceivers 708 (e.g., Peanut, Bluetooth, Zigbee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile communication device 700 may include one or more cellular network wireless modem chip(s) 716 coupled to the processor and antennae 710 that enables communication via two or more cellular networks via two or more radio access technologies.

The mobile communication device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

The mobile communication device 700 may also include speakers 714 for providing audio outputs. The mobile communication device 700 may also include a housing 720, constructed of a plastic, metal, or a combination of materials, for containing all or some of the components discussed herein. The mobile communication device 700 may include a power source 722 coupled to the processor 702, such as a disposable or rechargeable battery. The rechargeable battery may also be coupled to the peripheral device connection port to receive a charging current from a source external to the mobile communication device 700. The mobile communication device 700 may also include a physical button 724 for receiving user inputs. The mobile communication device 700 may also include a power button 726 for turning the mobile communication device 700 on and off.

The processor 702 may be any programmable microprocessor, microcomputer or multiple processor chip or chips that can be configured by software instructions (applications) to perform a variety of functions, including the functions of various embodiments described below. In some mobile communication devices, multiple processors 702 may be provided, such as one processor dedicated to wireless communication functions and one processor dedicated to running other applications. Typically, software applications may be stored in the internal memory 706 before they are accessed and loaded into the processor 702. The processor 702 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, the various embodiments are not intended to be limited to the embodiments shown herein but are to be accorded the widest scope consistent with the following claims and the principles and novel features disclosed herein.

What is claimed is:

1. A method for managing tune-away in a multi-subscription communication device having a plurality of radio frequency (RF) chains, the method comprising:
    determining, by the multi-subscription communication device, a first signal strength of a first cell signal and a second signal strength of a second cell signal;
    identifying one of the first cell signal or the second cell signal as a weaker cell signal to use for performing a tune-away procedure based on a comparison of the first signal strength of the first cell signal and the second signal strength of the second cell signal; and
    performing, by the multi-subscription communication device, the tune-away procedure to the identified weaker cell signal, wherein one or more of the plurality of RF chains are tuned to the first cell signal to perform the tune-away procedure in response to identifying the first cell signal as the identified weaker cell signal and wherein one or more of the plurality of RF chains are tuned to the second cell signal to perform the tune-away procedure in response to identifying the second cell signal as the identified weaker cell signal.

2. The method of claim 1, wherein determining a first signal strength of a first cell signal and a second signal strength of a second cell signal comprises:
    determining the first signal strength and the second signal strength just prior to the tune-away procedure.

3. The method of claim 1, wherein determining a first signal strength of a first cell signal and a second signal strength of a second cell signal comprises:
    determining a signal strength of each component carrier of the first cell signal and a signal strength of each component carrier of the second cell signal.

4. The method of claim 3, further comprising:
    identifying from among the component carriers of the first and second cell signals a component carrier with a weakest signal strength; and
    performing the tune-away procedure to a cell signal of the first and second cell signals having the component carrier with the weakest signal strength.

5. The method of claim 4, further comprising:
    determining a carrier aggregation scheduling mechanism used in the first and second cell signals; and
    identifying from among secondary component carriers of each of the first and second cell signals a component carrier with a weakest signal strength in response to determining that the carrier aggregation scheduling mechanism is cross-carrier scheduling.

6. The method of claim 5, further comprising:
    determining whether a transceiver corresponding to the secondary component carrier with the weakest signal strength can be configured to perform the tune-away procedure; and
    identifying a component carrier with a weakest signal strength associated with a different transceiver that can be configured to perform the tune-away procedure in response to determining that the transceiver corresponding to the component carrier with the weakest signal strength cannot be configured to perform the tune-away procedure.

7. The method of claim 4, further comprising:
determining a carrier aggregation scheduling mechanism used in the first and second cell signals; and
identifying from among a primary component carrier and secondary component carriers of the first and second cell signals, respectively, a component carrier with a weakest signal strength in response to determining that the carrier aggregation scheduling mechanism is same-carrier scheduling.

8. The method of claim 7, further comprising:
determining whether a transceiver corresponding to the component carrier with the weakest signal strength can be configured to perform the tune-away procedure; and
identifying a component carrier with a weakest signal strength associated with a different transceiver that can be configured to perform the tune-away procedure in response to determining that the transceiver corresponding to the component carrier with the weakest signal strength cannot be configured to perform the tune-away procedure.

9. The method of claim 7, wherein performing the tune-away procedure to the weaker of the first cell signal and the second cell signal comprises tuning a receiver of the multi-subscription communication device to the component carrier with the weakest signal strength and not tuning a transmitter of the multi-subscription communication device associated with the receiver to the component carrier with the weakest signal strength in response to determining that the carrier aggregation scheduling mechanism is same-carrier scheduling.

10. The method of claim 7, further comprising:
determining whether the primary component carrier includes the weakest signal strength; and
performing the tune-away procedure using receiver-only tune-away (ROTA) in a transceiver corresponding to the component carrier with the weakest signal strength in response to determining that the primary component carrier includes the weakest signal strength.

11. The method of claim 7, further comprising:
determining whether the primary component carrier includes the weakest signal strength; and
performing the tune-away procedure using a transceiver corresponding to the component carrier with the weakest signal strength in response to determining that the primary component carrier does not include the weakest signal strength.

12. The method of claim 7, further comprising determining just before a next tune-away period begins whether an assignment of the primary component carrier has been changed,
wherein determining the carrier aggregation scheduling mechanism used in the first and second cell signals is performed in response to determining that the assignment of the primary component carrier has been changed.

13. The method of claim 12, further comprising:
identifying from among secondary component carriers of each of the first and second cell signals a component carrier with a weakest signal strength in response to determining that the carrier aggregation scheduling mechanism is cross-carrier scheduling.

14. The method of claim 1, further comprising:
determining a type of carrier aggregation used in the first and second cell signals;

adjusting a signal strength difference threshold based on the determined type of carrier aggregation;
comparing a difference between the first signal strength and the second signal strength to the signal strength difference threshold; and
selecting one of the first cell signal and the second cell signal for the tune-away procedure when the difference between the first signal strength and the second signal strength exceeds the signal strength difference threshold.

15. A multi-subscription communication device, comprising:
a plurality of radio frequency (RF) chains; and
a processor coupled to the plurality of RF chains and configured to:
determine a first signal strength of a first cell signal and a second signal strength of a second cell signal;
identify one of the first cell signal or the second cell signal as a weaker cell signal to use for performing a tune-away procedure based on a comparison of the first signal strength of the first cell signal and the second signal strength of the second cell signal; and
perform the tune-away procedure to the identified weaker cell signal, wherein one or more of the plurality of RF chains are tuned to the first cell signal to perform the tune-away procedure in response to identifying the first cell signal as the identified weaker cell signal and wherein one or more of the plurality of RF chains are tuned to the second cell signal to perform the tune-away procedure in response to identifying the second cell signal as the identified weaker cell signal.

16. The multi-subscription communication device of claim 15, wherein the processor is further configured to determine the first signal strength and the second signal strength just prior to the tune-away procedure.

17. The multi-subscription communication device of claim 15, wherein the processor is further configured to determine a signal strength of each component carrier of the first cell signal and a signal strength of each component carrier of the second cell signal.

18. The multi-subscription communication device of claim 17, wherein the processor is further configured to:
identify from among the component carriers of the first and second cell signals a component carrier with a weakest signal strength; and
perform the tune-away procedure to a cell signal of the first and second cell signals having the component carrier with the weakest signal strength.

19. The multi-subscription communication device of claim 18, wherein the processor is further configured to:
determine a carrier aggregation scheduling mechanism used in the first and second cell signals; and
identify from among a secondary component carrier of each of the first and second cell signals a component carrier with a weakest signal strength in response to determining that the carrier aggregation scheduling mechanism is cross-carrier scheduling.

20. The multi-subscription communication device of claim 19, wherein the processor is further configured to:
determine whether a transceiver corresponding to the secondary component carrier with the weakest signal strength can be configured to perform the tune-away procedure; and
identify a component carrier with a weakest signal strength associated with a different transceiver that can be configured to perform the tune-away procedure in response to determining that the transceiver corresponding to the component carrier with the weakest signal strength cannot be configured to perform the tune-away procedure.

21. The multi-subscription communication device of claim 18, wherein the processor is further configured to:
determine a carrier aggregation scheduling mechanism used in the first and second cell signals; and
identify from among a primary component carrier and a secondary component carrier of the first and second cell signals, respectively, a component carrier with a weakest signal strength in response to determining that the carrier aggregation scheduling mechanism is same-carrier scheduling.

22. The multi-subscription communication device of claim 21, wherein the processor is further configured to:
determine whether a transceiver corresponding to the component carrier with the weakest signal strength can be configured to perform the tune-away procedure; and
identify a component carrier with a weakest signal strength associated with a different transceiver that can be configured to perform the tune-away procedure in response to determining that the transceiver corresponding to the component carrier with the weakest signal strength cannot be configured to perform the tune-away procedure.

23. The multi-subscription communication device of claim 21, wherein the processor is further configured to tune a receiver of the multi-subscription communication device to the component carrier with the weakest signal strength and not tune a transmitter of the multi-subscription communication device associated with the receiver to the component carrier with the weakest signal strength in response to determining that the carrier aggregation scheduling mechanism is same-carrier scheduling.

24. The multi-subscription communication device of claim 21, wherein the processor is further configured to:
determine whether the primary component carrier includes the weakest signal strength; and
perform the tune-away procedure using receiver-only tune-away (ROTA) in a transceiver corresponding to the component carrier with the weakest signal strength in response to determining that the primary component carrier includes the weakest signal strength.

25. The multi-subscription communication device of claim 21, wherein the processor is further configured to:
determine whether the primary component carrier includes the weakest signal strength; and
perform the tune-away procedure using a transceiver corresponding to the component carrier with the weakest signal strength in response to determining that the primary component carrier does not include the weakest signal strength.

26. The multi-subscription communication device of claim 21, wherein the processor is further configured to:
determine just before a next tune-away period begins whether an assignment of the primary component carrier has been changed; and
determine the carrier aggregation scheduling mechanism used in the first and second cell signals in response to determining that the assignment of the primary component carrier has been changed.

27. The multi-subscription communication device of claim 26, wherein the processor is further configured to:
identify from among secondary component carriers of each of the first and second cell signals a component carrier with a weakest signal strength in response to determining that the carrier aggregation scheduling mechanism is cross-carrier scheduling.

28. The multi-subscription communication device of claim 15, wherein the processor is further configured to:
determine a type of carrier aggregation used in the first and second cell signals;
adjust a signal strength difference threshold based on the determined type of carrier aggregation;
compare a difference between the first signal strength and the second signal strength to the signal strength difference threshold; and
select one of the first cell signal and the second cell signal for the tune-away procedure when the difference between the first signal strength and the second signal strength exceeds the signal strength difference threshold.

29. A non-transitory processor-readable storage medium having stored thereon processor-executable software instructions configured to cause a processor of a multi-subscription communication device having a plurality of radio frequency (RF) chains to perform operations comprising:
determining a first signal strength of a first cell signal and a second signal strength of a second cell signal; and
identifying one of the first cell signal or the second cell signal as a weaker cell signal to use for performing a tune-away procedure based on a comparison of the first signal strength of the first cell signal and the second signal strength of the second cell signal; and
performing, by the multi-subscription communication device, the tune-away procedure to the identified weaker cell signal, wherein one or more of the plurality of RF chains are tuned to the first cell signal to perform the tune-away procedure in response to identifying the first cell signal as the identified weaker cell signal and wherein one or more of the plurality of RF chains are tuned to the second cell signal to perform the tune-away procedure in response to identifying the second cell signal as the identified weaker cell signal.

30. A multi-subscription communication device, comprising:
means for determining a first signal strength of a first cell signal and a second signal strength of a second cell signal;
means for identifying one of the first cell signal or the second cell signal as a weaker cell signal to use for performing a tune-away procedure based on a comparison of the first signal strength of the first cell signal and the second signal strength of the second cell signal; and
means for performing the tune-away procedure to the identified weaker cell signal, wherein one or more of the plurality of RF chains are tuned to the first cell signal to perform the tune-away procedure in response to identifying the first cell signal as the identified weaker cell signal and wherein one or more of the plurality of RF chains are tuned to the second cell signal to perform the tune-away procedure in response to identifying the second cell signal as the identified weaker cell signal.

* * * * *